United States Patent
Krejci et al.

(10) Patent No.: US 7,718,138 B2
(45) Date of Patent: May 18, 2010

(54) DEVICE FOR INTRODUCING GAS INTO A FLUIDISED BED AND A PROCESS THEREFOR

(75) Inventors: Klaus Krejci, Burghausen (DE); Peter Kammerhofer, Burgkirchen (DE); Ingolf Mielke, Burgkirchen (DE); Uwe Wäterling, Garching (DE)

(73) Assignee: Vinnolit Technologie GmbH & Co. KG, Burgkirchen (DE)

( * ) Notice: Subject to any disclaimer, the term of this patent is extended or adjusted under 35 U.S.C. 154(b) by 1042 days.

(21) Appl. No.: 10/521,418

(22) PCT Filed: May 26, 2003

(86) PCT No.: PCT/EP03/05514

§ 371 (c)(1),
(2), (4) Date: Jul. 7, 2005

(87) PCT Pub. No.: WO2004/009228

PCT Pub. Date: Jan. 29, 2004

(65) Prior Publication Data

US 2005/0250967 A1 Nov. 10, 2005

(30) Foreign Application Priority Data

Jul. 18, 2002 (DE) ................. 102 32 789

(51) Int. Cl.
*B01J 8/18* (2006.01)
*F27B 15/00* (2006.01)
*C07C 17/00* (2006.01)
*C10J 1/08* (2006.01)
*F02M 29/04* (2006.01)
*B01J 8/44* (2006.01)

(52) U.S. Cl. ............. 422/139; 570/243; 261/114.1; 261/114.2; 261/114.3; 261/114.4; 261/114.5; 422/311

(58) Field of Classification Search ............. 422/139, 422/243, 311; 570/243; 261/114.1–114.5; 239/241, 245
See application file for complete search history.

(56) References Cited

U.S. PATENT DOCUMENTS 2,191,919 A * 2/1940 Thayer ................. 422/256
2,507,325 A * 5/1950 Throckmorton et al. .. 261/114.2

(Continued)

FOREIGN PATENT DOCUMENTS

CN 86 1 07458 A 6/1987

(Continued)

OTHER PUBLICATIONS

International Search Report.

*Primary Examiner*—Walter D Griffin
*Assistant Examiner*—Natasha Young
(74) *Attorney, Agent, or Firm*—Peter F. Corless; George N. Chaclas; Edwards Angell Palmer & Dodge LLP

(57) ABSTRACT

The present invention relates to a device and a process for introducing gas into a fluidised bed reactor having at least one gas inlet pipe (2, 3) located underneath and/or above the fluidised bed for introducing gas into the fluidised bed, characterized in that the gas inlet pipe (2, 3) has gas-swirling means upstream of and/or at its mouth.

20 Claims, 3 Drawing Sheets

U.S. PATENT DOCUMENTS

| | | | |
|---|---|---|---|
| 3,466,021 A | | 9/1969 | Weert et al. |
| 4,074,975 A | * | 2/1978 | Tokura et al. ............... 422/171 |
| 4,329,526 A | * | 5/1982 | Bagley et al. ............... 570/203 |
| 4,659,455 A | | 4/1987 | Dall et al. |
| 4,715,996 A | * | 12/1987 | Lambousy et al. ....... 261/114.2 |
| 4,838,906 A | * | 6/1989 | Kiselev ....................... 96/306 |
| 4,863,500 A | | 9/1989 | Rombout et al. |
| 4,874,583 A | * | 10/1989 | Colvert ....................... 422/143 |
| 5,328,592 A | * | 7/1994 | Hedrick ....................... 208/113 |
| 6,076,810 A | | 6/2000 | Chang et al. |
| 6,177,599 B1 | * | 1/2001 | Cowfer et al. ............... 570/245 |
| 6,199,835 B1 | | 3/2001 | Coulaloglou et al. |
| 6,227,524 B1 | * | 5/2001 | Kiselev et al. ............. 261/79.2 |
| 6,417,414 B1 | * | 7/2002 | Ertl et al. .................... 570/243 |

FOREIGN PATENT DOCUMENTS

| | | | |
|---|---|---|---|
| DE | 28 46 350 A1 | | 4/1980 |
| DE | 43 05 001 A1 | | 8/1994 |
| DE | 19542942 A1 | * | 5/1997 |
| FR | 2 080 666 A | | 11/1971 |
| WO | WO-94/19099 A1 | | 9/1994 |
| WO | WO-2004/009228 | | 1/2004 |

* cited by examiner

FIGURE I
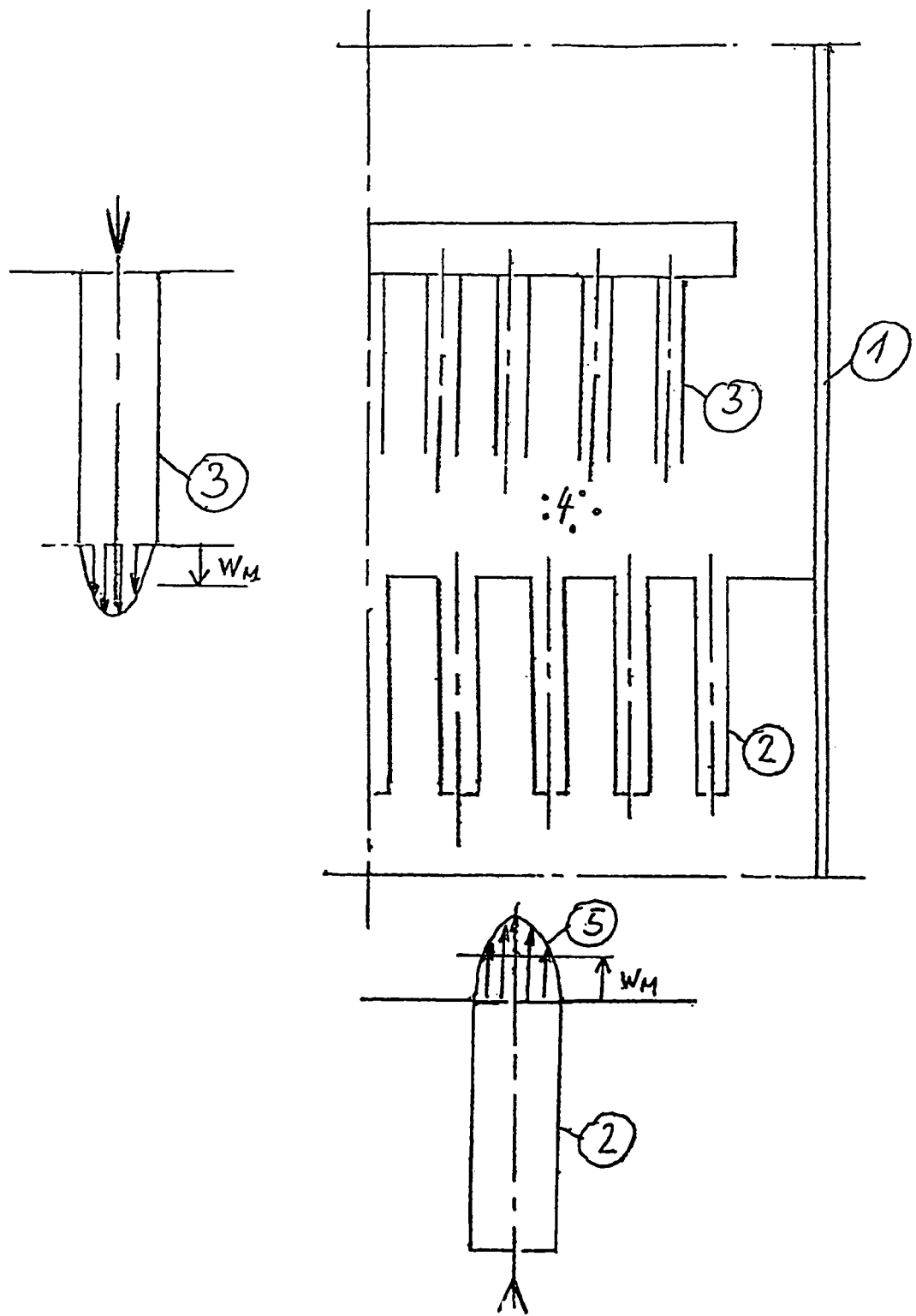

FIGURE II
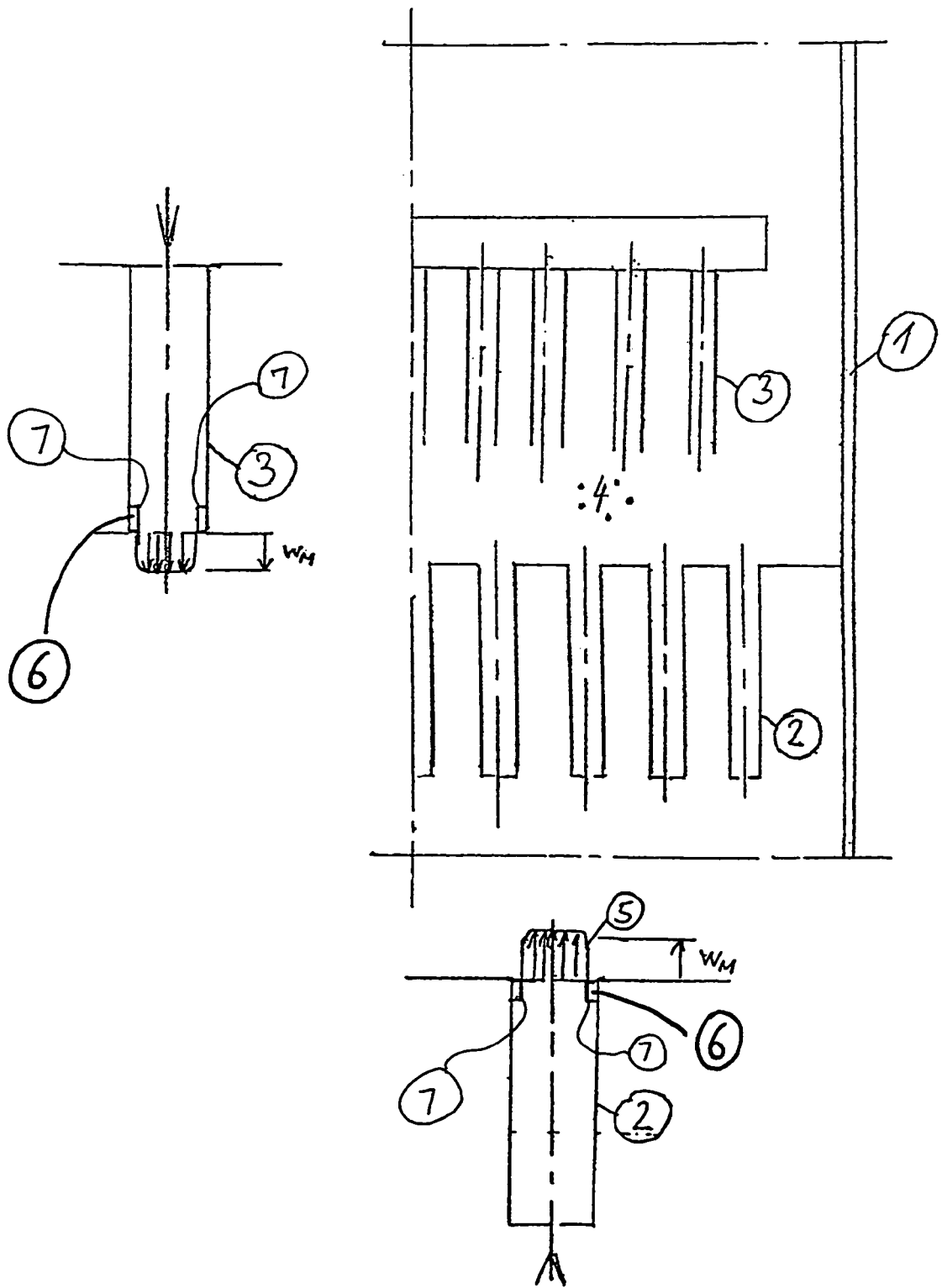

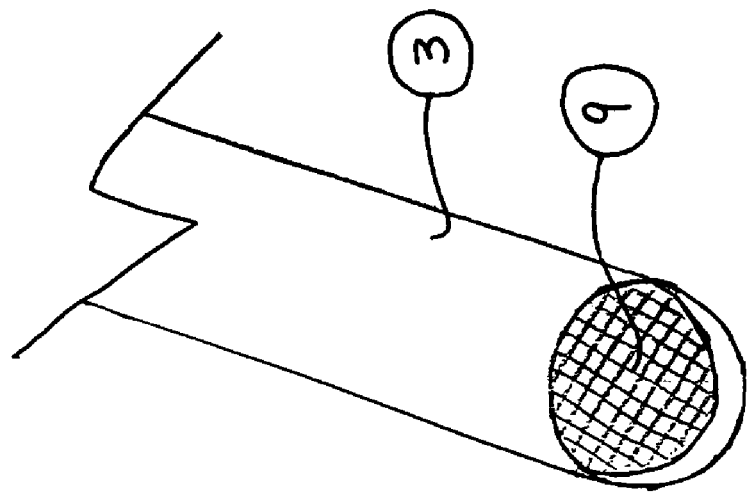
FIGURE IIIB
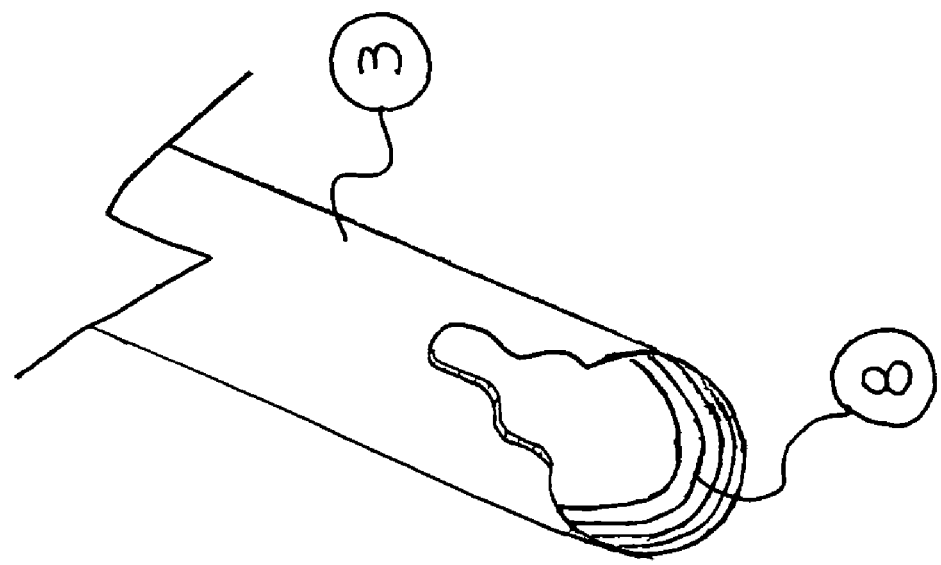
FIGURE IIIA

DEVICE FOR INTRODUCING GAS INTO A FLUIDISED BED AND A PROCESS THEREFOR

The invention relates to a device for introducing gas into a fluidised bed, and to a fluidised bed reactor comprising such a gas introduction device. The invention relates also to a process for the oxychlorination of ethylene to form 1,2-dichloroethane using a fluidised bed reactor according to the invention.

Fluidised bed reactors usually comprise a bed of a fine-grained solid which usually acts as catalyst for the reaction being carried out. The substances that are reacted in the reactor are most frequently gases, as are the reaction products leaving the reactor at its head. The introduction and mixing of the reactants takes place in the lower portion of the reactor, especially above and/or below the fluidised bed. An important role in the optimisation of the reaction is played by the gas inlet and distribution systems with which the reactants are mixed and brought into contact with the catalyst. The fluidised bed is maintained in a suspended state by the gases introduced or by inert gases and thus has a fluid-like character. In the case of exothermic reactions this facilitates the transfer of the heat of reaction to coolants which circulate, for example, in internal components especially suited to that purpose, such as pipes, in the reactor. On the other hand, endothermic reactions can be assisted by special heating devices, for which purpose heating panels, for example, are used.

After the gaseous reactants have been passed through the fluidised bed, the gas current leaving the fluidised bed entrains fluidised bed particles which, on economic and ecological grounds, have to be separated out and returned to the fluidised bed. Suitable devices for retaining the fluidised bed particles are, for example, centrifugal separators and filters. In most cases, however, it is not possible for all the fluidised bed particles to be separated, fine-grained particles (for example catalyst dust), especially, being lost. The loss of catalyst associated with the loss of fluidised bed particles therefore represents a considerable economic limitation. Furthermore, catalysts often have toxic properties or are harmful to the environment, so that their separation and isolation from the reaction products can give rise to considerable expense.

It follows from the reasons given above that it is advantageous to suppress the formation of fine-grained particles as comprehensively as possible.

It is known that the formation of fine-grained particles is chiefly a result of grinding and abrading processes within the fluidised bed against the cooling pipes and the reactor wall, or is caused by the introduction of the gas. An increase in the formation of fine-grained particles can be counteracted, for example, by fluidised bed particles having a certain degree of resistance to abrasion. In the case of a catalyst applied to a carrier material, the resistance to abrasion is essentially determined by the carrier material. On the other hand, however, the use of abrasion-resistant (hard) fluidised bed particles also leads to increased wear on cooling pipes and the gas inlet pipes for introducing gas into the reactor. As a result, high repair costs and repair-related losses of production are likely.

The aim of the present invention is therefore to provide a device for the improved introduction of gas into fluidised bed reactors in which the losses of catalyst caused by pulverisation of the catalyst and discharge thereof with the gas currents can be reduced at the least possible expense.

That aim is achieved by a device for introducing gas into a fluidised bed having at least one gas inlet pipe (2, 3) located underneath and/or above the fluidised bed, which device is characterised in that the gas inlet pipe (2, 3) has gas-swirling means upstream of and/or at its mouth.

Advantageous configurations of the invention are given in the subsidiary claims. The fluidised bed may be present especially in a fluidised bed reactor, preferably in a vertical fluidised bed reactor. The jacket of the reactor can be in the form of a pressure-bearing jacket for receiving the gas or the gases and at least one fluidised bed of particulate solids located therein.

The gas introduction device according to the invention is characterised in that the gas inlet pipe(s) effect(s) swirling of the transported gas current.

Surprisingly, it has been found that pulverisation of the catalyst can be drastically reduced by a simple modification of the gas inlet pipes conventionally used, by means of which the gas current transported in the gas inlet pipes is swirled. Such swirling of the gas current presumably has the result that the velocity profile of the gas current being discharged from the gas inlet pipe changes in favour of a rise in the volumetric flow in the vicinity of the pipe wall. For example, the swirled gas currents emerge from the gas inlet pipes with a velocity profile that is approximately constant over the cross-section of the gas inlet pipe.

When the gas inlet pipes are arranged underneath the fluidised bed, the swirling of the gas current and the resulting modification of the velocity profile of the volumetric flow largely or completely prevents fluidised bed particles at the margins of the gas inlet pipe(s) from falling into the pipe(s) and being pulverised therein to form fine-grained particles capable of being discharged from the reactor. Advantageously, therefore, a reduction in the dust discharge is achieved.

When the gas inlet pipes are arranged above the fluidised bed, it has been found that in this case too the formation of dust and dust discharge are reduced. In particular, a reduction in the wear on gas pipes and cooling pipes can also be achieved as a result. The reason for this is presumably that during discharge of the gas current the gas bubbles are not immediately directed upwards.

In an advantageous embodiment of the invention, swirling of the gas current transported in the gas inlet pipes is effected by the gas-swirling means—especially at their outlet-side end—forming a narrowing or widening of the pipe lumen. Such a narrowing can take the form, for example, of a bead, for example an annular bead, arranged around at least part of the inner circumference of the gas inlet pipe. The narrowing or widening of the pipe lumen can take the form of a thread arranged on the inner circumference. It has proved especially advantageous for the narrowing to be provided with at least one edge, especially a sharp edge, because this favours swirling of the gas current. Furthermore or in addition the gas-swirling means can have at least one screen and/or at least one turbulence grid and/or at least one perforated diaphragm. The gas-swirling means can be arranged at the mouth of the gas inlet pipe(s) and/or upstream of the mouth of the gas inlet pipe(s) in the direction of flow.

The invention will be described in greater detail below by reference to the description of an embodiment, reference being made to the accompanying drawings.

FIG. 1 shows a diagrammatic view of a fluidised bed reactor having conventional gas inlet pipes for introducing gas currents into the fluidised bed;

FIG. 2 shows a diagrammatic view of a fluidised bed reactor having gas inlet pipes for introducing gas currents into the fluidised bed in accordance with the present invention.

FIG. 3A shows a perspective view of a threaded mouth of another gas inlet pipe in accordance with the present invention.

FIG. 3B shows a perspective view of the mouth of still another gas inlet pipe having a screen, turbulence grid or perforated diaphragm in accordance with the present invention.

Referring firstly to FIG. 1, FIG. 1 shows a fluidised bed reactor having a pressure-resistant casing 1, a fluidised bed 4 and, located therein, a device for introducing gas into the reactor. The gas introduction device comprises a plurality of gas inlet pipes 3, which are arranged above the fluidised bed 4, for introducing gas currents into the fluidised bed 4 from above and a plurality of gas inlet pipes 2, which are arranged underneath the fluidised bed 4, for introducing gas currents into the fluidised bed 4 from below. As shown in diagrammatic form in the two enlarged views of the gas inlet pipes arranged above and underneath the fluidised bed 4, in the case of the gas inlet pipes customary in the prior art a substantially parabolic velocity profile (5) of the gas current becomes established over the cross-sectional area of the pipe. The reactor shown in FIG. 1 has a diameter of 28 cm and a height of 2.3 m.

Referring now to FIG. 2, FIG. 2 shows a fluidised bed reactor having gas inlet pipes for introducing gas currents in accordance with the present invention, which differs from the reactor shown in FIG. 1 in that the gas inlet pipes of the device for introducing gas currents of FIG. 2 are provided, in accordance with the invention, with a narrowing of the pipe lumen for swirling the gas current. Preferably, the narrowing has at least one edge 7. The gas inlet pipes 2, 3 have for that purpose an annular bead 6 which is arranged around the internal circumference at their outlet-side end. As shown in diagrammatic form in the two enlarged views of the gas inlet pipes arranged above and underneath the fluidised bed 4, as a result of the annular bead 6 the parabolic velocity profile known for the pipes in the prior art is flattened off in favour of an increase in the gas current velocity in the vicinity of the margin of the pipe. In particular, the velocity profile (5) of the gas current emerging from a gas inlet pipe is substantially constant over the cross-section of the gas inlet pipe. The average flow velocity Wm is also shown with respect to the velocity profile 5.

The fluidised bed reactor of FIG. 2 is especially suitable for the oxychlorination of ethene, which will now be described by way of example.

Oxychlorination is understood generally as meaning the reaction of an alkene—in this case ethene—with hydrogen chloride and oxygen or an oxygen-containing gas, such as air, to form a saturated chlorinated alkane—in this case 1,2-dichloroethane, referred to as "EDC" below—in accordance with the equation:

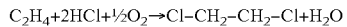

$$C_2H_4 + 2HCl + \tfrac{1}{2}O_2 \rightarrow Cl\text{-}CH_2\text{-}CH_2\text{-}Cl + H_2O$$

For this reaction there is used, for example, a catalyst in the form of copper(II) chloride applied to aluminium oxide particles. The catalyst particles have, for example, an average particle diameter of about 50 μm, with a particle range of from 20 to 120 μm. The particle density is approximately 1600 kg/m³ The inflow of circulating gas and reaction gas cause the catalyst particles to form a fluidised bed.

In the fluidised bed reactor according to the invention of FIG. 2, the reactants, which are heated to 150° C., are introduced in gaseous form, a mixture of 63 Nm³/h of hydrogen chloride and 17 Nm³/h of oxygen flowing into the catalyst fluidised bed 4 through the gas inlet pipes 3 arranged above the fluidised bed 4. A mixture of 32 Nm³/h of ethene and 60 Nm³/h of circulating gas flows into the catalyst fluidised bed 4 from below through the gas inlet pipes 2 at a temperature of 150° C. and a pressure of 4.7 bar. The average flow velocity Wm is 1.3 m/s in the gas inlet pipes 2 and 1.0 m/s in the gas inlet pipes 3.

In the lower portion of the fluidised bed 4, the reactants, which are distributed over the reactor cross-section, are mixed in the so-called mixing zone and react exothermically on the catalyst. The heat of reaction of 238.5 KJ/mol thereby produced is conveyed by way of cooling pipes (not shown) to a heat transfer medium. The reaction temperature is 232° C., at a reaction pressure 4.2 bar.

Measurements of the amount of fluidised bed particles before and after the reaction have shown that the loss of catalyst caused by pulverisation and by discharge of catalyst particles by way of the outflowing gas is approximately 7.6 g per t of EDC.

COMPARISON EXAMPLE

For comparison, the oxychlorination of ethene to EDC is carried out in the conventional fluidised bed reactor of FIG. 1, the conditions otherwise being the same. Measurements of the amount of fluidised bed particles have shown that the loss of catalyst per t of EDC is approximately 48 g, that is to say about 7 times the amount of the loss in the case of a fluidised bed reactor according to the present invention.

FIG. 3A shows a perspective view of another gas inlet pipe 3 having threads 8 to help accomplish the desired gas swirling. FIG. 3B shows a perspective view of still another gas inlet pipe 3 having another feature 9 for gas swirling. The feature 9 secures within the gas inlet pipe 3. The feature 9 may be a screen, turbulence grid or perforated diaphragm, which acts to create a gas swirling effect.

While the invention has been described with respect to preferred embodiments, those skilled in the art will readily appreciate that various changes and/or modifications can be made to the invention without departing from the spirit or scope of the invention as defined by the claims.

The invention claimed is:

1. A device for introducing gas into a fluidized bed comprising:
   at least one gas inlet pipe located underneath and/or above the fluidized bed,
   wherein the gas inlet pipe has gas-swirling means at its mouth, the gas-swirling means comprising at least one bead.

2. A device of claim 1 wherein the narrowing has at least one edge.

3. A device of claim 1 wherein the gas comprises ethane, oxygen and/or hydrogen chloride.

4. A fluidized reactor bed comprising a device of claim 1.

5. A process for the production of 1,2-dichloroethane with a fluidized bed reactor comprising a device for introducing gas, the method comprising:
   introducing ethene, oxygen and/or hydrogen chloride into a fluidized bed comprising a catalyst,
   wherein the device comprises at least one gas inlet pipe located underneath and/or above the fluidized bed and the gas inlet pipe has gas-swirling means at its mouth, the gas-swirling means comprising at least one bead.

6. The process of claim 5 wherein the gas inlet pipe is arranged underneath the fluidized bed and the gas current is discharged at an average discharge velocity in the range of from 0.5 to 10 m/s.

7. The process of claim 5 wherein the gas inlet pipe is arranged underneath the fluidized bed and the gas current is discharged at an average discharge velocity in the range of from 3 to 6 m/s.

8. The process of claim 5 wherein the gas inlet pipe is arranged above the fluidized bed and the gas current is discharged at an average discharge velocity in the range of from 0.7 to 10 m/s.

9. The process of claim 5 wherein the gas inlet pipe is arranged above the fluidized bed and the gas current is discharged at an average discharge velocity in the range of from 2 to 5 m/s.

10. A device of claim 1 wherein the at least one bead has at least one edge.

11. A device of claim 10 wherein the at least one edge is a sharp edge.

12. A device of claim 1 wherein the at least one bead is an annular bead arranged at least part of an inner circumference of the gas inlet pipe.

13. A device for introducing gas into a fluidized bed comprising:
    at least one gas inlet pipe located underneath and/or above the fluidized bed,
    wherein the gas inlet pipe has gas-swirling means at its mouth, the gas-swirling means comprising at least one screen, at least one turbulence grid and/or at least one perforated diaphragm.

14. A device of claim 13 wherein the gas comprises ethene, oxygen and/or hydrogen chloride.

15. A fluidized reactor bed comprising a device of claim 13.

16. A process for the production of 1,2-dichloroethane with a fluidized bed reactor comprising a device for introducing gas, the method comprising:
    introducing ethene, oxygen and/or hydrogen chloride into a fluidized bed comprising a catalyst,
    wherein the device comprises at least one gas inlet pipe located underneath and/or above the fluidized bed and the gas inlet pipe has gas-swirling means at its mouth, the gas-swirling means comprising at least one screen, at least one turbulence grid and/or at least one perforated diaphragm.

17. The process of claim 16 wherein the gas inlet pipe is arranged underneath the fluidized bed and the gas current is discharged at an average discharge velocity in the range of from 0.5 to 10 m/s.

18. The process of claim 16 wherein the gas inlet pipe is arranged underneath the fluidized bed and the gas current is discharged at an average discharge velocity in the range of from 3 to 6 m/s.

19. The process of claim 16 wherein the gas inlet pipe is arranged above the fluidized bed and the gas current is discharged at an average discharge velocity in the range of from 0.7 to 10 m/s.

20. The process of claim 16 wherein the gas inlet pipe is arranged above the fluidized bed and the gas current is discharged at an average discharge velocity in the range of from 2 to 5 m/s.

\* \* \* \* \*